US008126028B2

(12) United States Patent
Clifford, Jr.

(10) Patent No.: US 8,126,028 B2
(45) Date of Patent: Feb. 28, 2012

(54) QUICKLY REPLACEABLE PROCESSING-LASER MODULES AND SUBASSEMBLIES

(75) Inventor: George M. Clifford, Jr., Los Altos Hills, CA (US)

(73) Assignee: NovaSolar Holdings Limited, Tortola (VG)

( * ) Notice: Subject to any disclaimer, the term of this patent is extended or adjusted under 35 U.S.C. 154(b) by 875 days.

(21) Appl. No.: 12/059,426

(22) Filed: Mar. 31, 2008

(65) Prior Publication Data

US 2009/0245318 A1    Oct. 1, 2009

(51) Int. Cl.
*H01S 3/02* (2006.01)
*F16M 11/00* (2006.01)

(52) U.S. Cl. ............ 372/107; 248/200; 29/464; 29/469; 219/121.6

(58) Field of Classification Search .................. 372/107; 29/464, 469; 219/121.6; 248/200
See application file for complete search history.

(56) References Cited

U.S. PATENT DOCUMENTS

| | | | | |
|---|---|---|---|---|
| 5,351,263 A | * | 9/1994 | von Borstel et al. | .......... 372/107 |
| 5,748,827 A | | 5/1998 | Holl et al. | |
| 6,069,752 A | * | 5/2000 | Harrigan et al. | .............. 359/822 |
| 6,424,670 B1 | * | 7/2002 | Sukhman et al. | ............. 372/107 |
| 7,436,868 B2 | * | 10/2008 | Schulte et al. | .................. 372/36 |
| 2001/0003027 A1 | * | 6/2001 | Imai | ................................ 430/22 |
| 2005/0087522 A1 | * | 4/2005 | Sun et al. | ................. 219/121.71 |
| 2006/0109757 A1 | * | 5/2006 | Nishiwaki et al. | ......... 369/44.14 |
| 2006/0249488 A1 | | 11/2006 | Jurgensen | |

* cited by examiner

*Primary Examiner* — Jessica Stultz
*Assistant Examiner* — Michael Carter
(74) *Attorney, Agent, or Firm* — Schwabe, Williamson & Wyatt, P.C.

(57) ABSTRACT

Pre-aligned, kinematically mounted modules including processing lasers, beam trains, and individually calibrated control beams are quickly and easily replaced on subassembly bases with minimal in situ alignment, and can maintain working-spot position to micron tolerances over ambient temperature variations of ±10° C. Subassembly bases, with features for kinematically mating to a plurality of pre-aligned laser modules and to a platform base incorporated in the laser processing tool, enable multi-module subassemblies to be quickly replaced with spare subassemblies of the same type, or swapped for subassemblies of a different type. The mating features and reversible locks are designed to mitigate thermal effects that are often a dominant cause of alignment drift in processing lasers.

11 Claims, 3 Drawing Sheets

Aligned, locked replacement module being attached to on-line subassembly plate

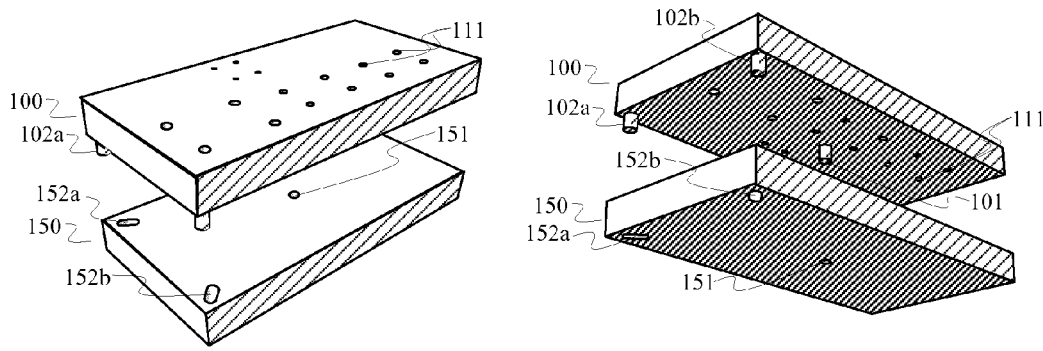
FIG. 1. Two shaded perspective views of an example module mounting base and module positioning base
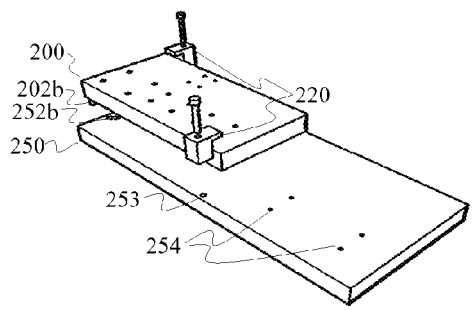
FIG. 2a. New module base being attached to offline alignment fixture
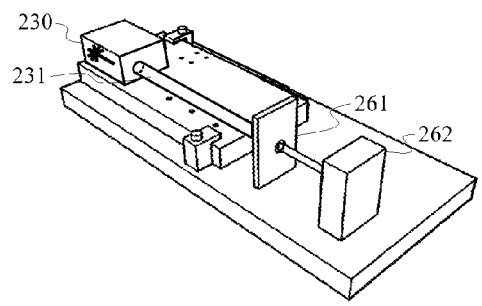
FIG. 2b. Working laser added, aligned on fixture
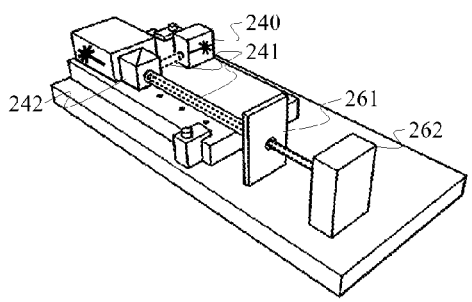
FIG. 2c. Control light source added, co-aligned to working beam on fixture
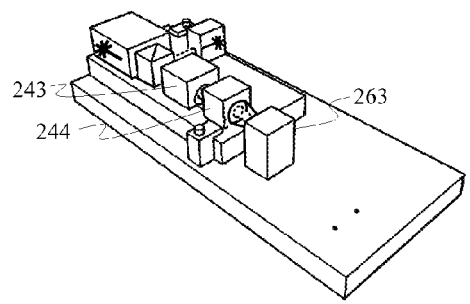
FIG. 2d. Beam-forming optics added, aligned to both beams on fixture

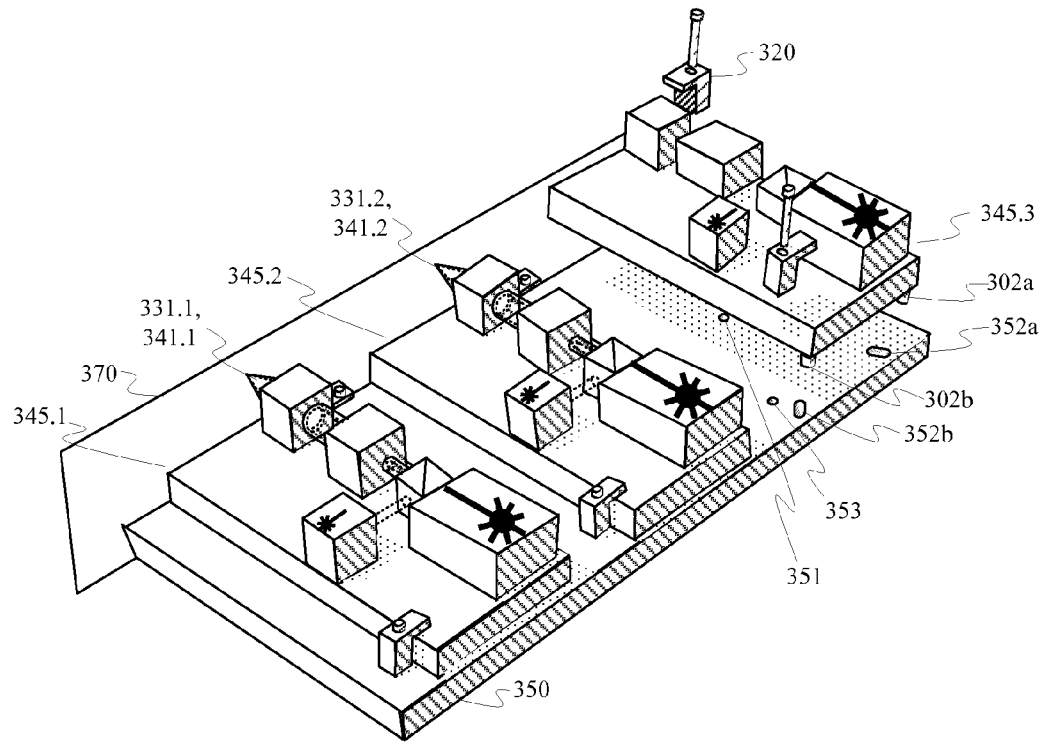
FIG. 3. Aligned, locked replacement module being attached to on-line subassembly plate
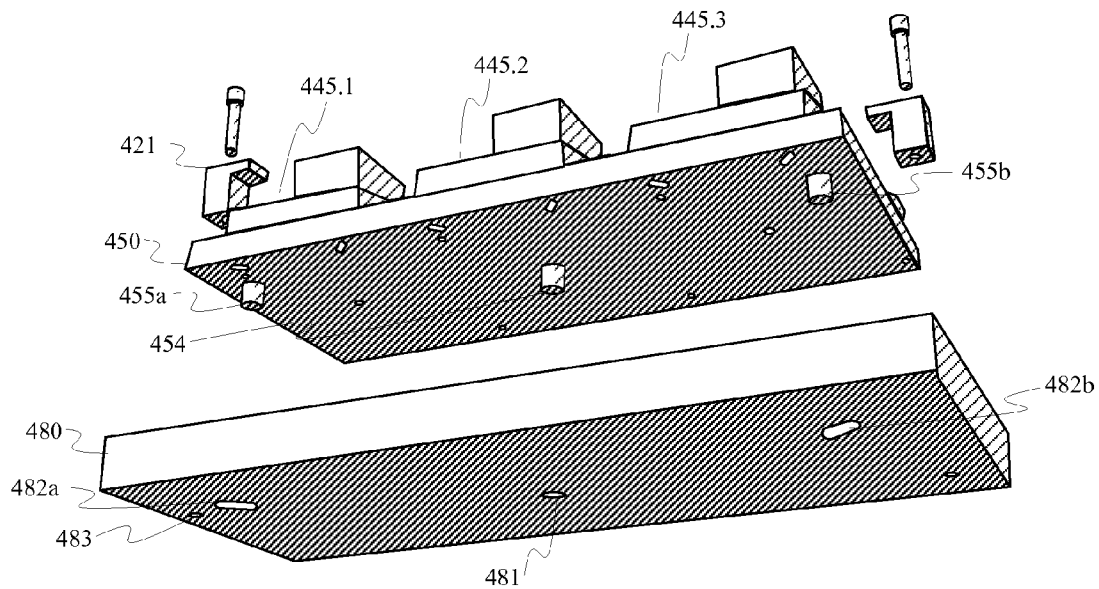
FIG. 4. Subassembly plate and laser platform with mating features
(Preferred Embodiment)

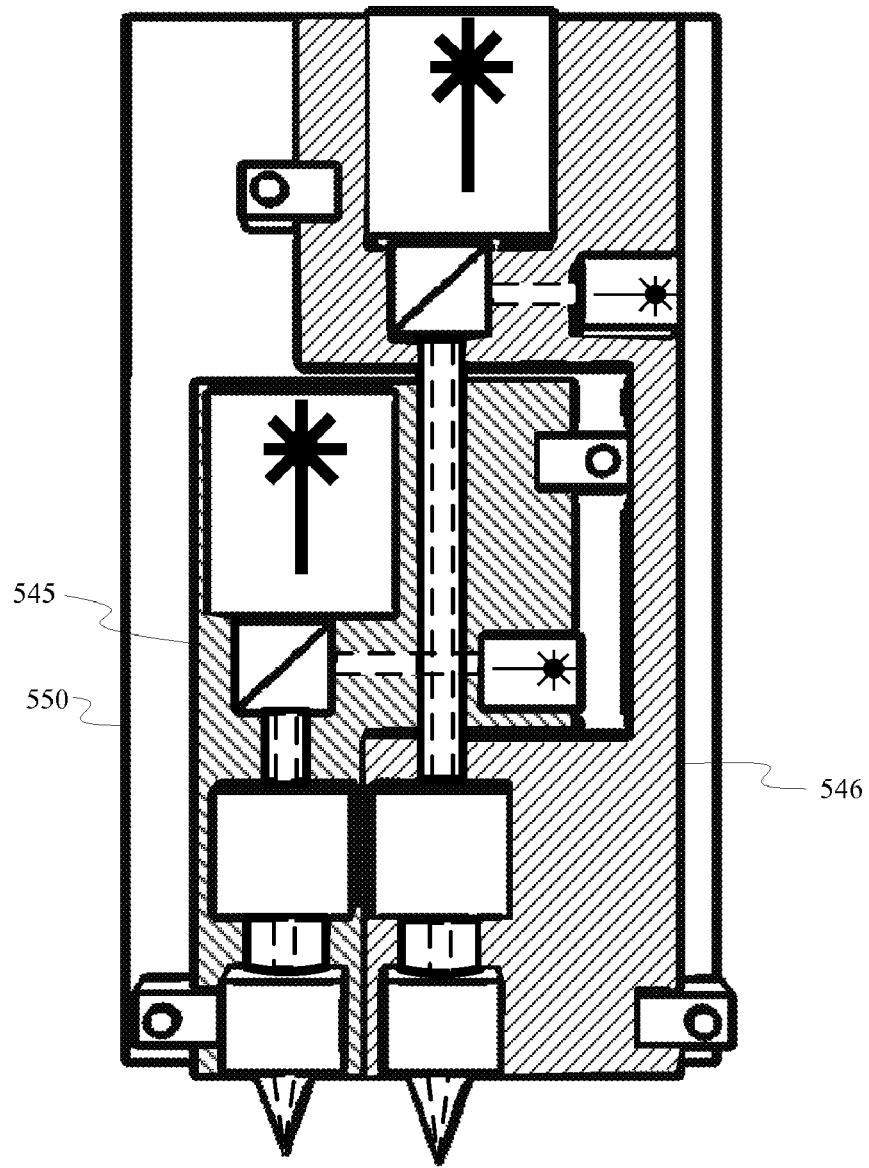
FIG. 5. Staggered arrangement of modules for closely spaced beams

QUICKLY REPLACEABLE PROCESSING-LASER MODULES AND SUBASSEMBLIES

RELATED APPLICATIONS

None

FEDERALLY SPONSORED RESEARCH AND DEVELOPMENT

None

APPENDICES

None

BACKGROUND OF THE INVENTION

This invention is related to mounted optics for laser processing of materials, particularly where the lasers are controlled by a closed-loop system using feedback data from a "control" beam that measures or illuminates, but does not process, the material. This invention is particularly applicable to ablation laser systems controlled by autofocus mechanisms, but can also be useful in laser cutting, welding, or annealing systems that use control beams to track and correct beam-pointing errors or to illuminate markers or fiducials.

Laser processing tools are widely used in many industries. Factories mass-producing high-precision components or products often have tens or hundreds of working lasers operating simultaneously. Processing lasers generally produce much more powerful beams than most lasers used in other common applications such as displays, data recorders and readers, and printers. High-power lasers often have shorter operating lifetimes and more reliability problems than their lower-power counterparts, because high-power lasers routinely exert more thermal, electrical, or other wear and tear on both internal and external components, and they can quickly and catastrophically damage their internal and external optics and mechanics if even a small amount of contaminant that absorbs the laser wavelength—such as a tiny speck of dust or a light film of outgassing residue—enters the beam path on or near a surface. The more processing lasers a factory operates simultaneously, the greater the probability that a laser or part of its beam train will fail, and need to be replaced, at any given time.

The time it takes to replace the laser on a laser-processing tool is "down-time" that increases ongoing production costs and may lead to costly missed delivery deadlines. Therefore, when a laser processing tool fails on a factory floor, it is highly desirable to replace the failed components quickly. For the reasons discussed above, the working laser and its beam-train optics are often the components most likely to fail.

However, most processing lasers and their optics cannot be quickly replaced when they fail because the unit-to-unit tolerances of these components exceed the alignment sensitivity of the process. The peak laser intensity, spot size, and position of the spot on the workpiece must almost always be tightly controlled. Some processes are also sensitive to the spot intensity profile, the shape of the wavefront at the workpiece, or the angle between the beam axis and the normal to the workpiece surface. Some of these key parameters (particularly spot size, spot intensity profile, and wavefront shape) are sensitive to changes in the optical path length (OPL) from the final component in the working-beam train to the workpiece. Surface contours on the workpiece, thermal alterations of workpiece thickness and other characteristics, thermal effects on the tool optics, and even thermal or pressure gradients in the atmosphere can change the OPL while a processing operation is ongoing. To ensure consistent performance after replacement of a laser or any of the beam-train optics, the system must be realigned before resuming use. Where multiple components are involved, realignment can take hours, and those hours of downtime add to production overhead costs.

The time, cost, and need frequency of alignments is further increased when laser-processing tools incorporate closed-loop control systems with active mechanisms to make "on-the-fly" adjustments during a processing cycle. Such control systems—for example, autofocus or leveling systems—are necessary to highly sensitive processes to compensate for variations in the characteristics of the working laser, the workpiece, or the surrounding environment. Sometimes the feedback for a closed-loop control system is an attenuated fraction of working laser itself, however, separate control beams are commonly used when the working laser is invisible, pulsed, or operating at a peak power that would damage readily available attenuators and detectors.

Depending on the sensitivity of the process to the parameter that the control beam controls, and on what type of light yields the best control data, control light sources may be low-power continuous-wave lasers, LEDs, or broadband lamps. Most control beams need to be aligned to run parallel or coaxial to the working beam they control. Some control beams, such as autofocus control beams, need to be calibrated to individual working beams when the laser-to-laser variations are too wide for the process to tolerate otherwise. The ability to calibrate control beams to a variety of individual working beams can relax tolerances on the expensive working lasers, reducing their cost. Therefore, replacement of failed processing lasers and beam-train optics must, in many cases, include recalibration of a separate control beam.

Quickly replaceable optical modules have been developed in such industries as fiber optic communications, printing, and information encoding and decoding. The modules include lasers and optics that have been pre-aligned on alignment fixtures and locked in place, and kinematic mounting features that precisely mate to corresponding features in the surrounding device. Commonly used kinematic features include spheres, sections of cones, rods, holes and slots, flats, and line contacts. However, the lasers in these modules are much lower in power, and both the lasers and the optics are both smaller in size and lighter in weight, than processing lasers and their optics. Many of the lasers incorporated into prior-art quickly replaceable modules also produce better beam quality and a smaller spot size over a longer distance, and therefore may have looser alignment tolerances in some cases, than higher-power multimode or superradiant lasers. Besides, although the prior-art modules often must maintain alignment over a wide range of ambient temperatures, the low-power lasers involved generally create very little heat of their own; nor are thermal effects on the workpiece usually a significant problem either. For these reasons, kinematic-module solutions that work well for low-power lasers cannot generally be easily adapted to high-power processing lasers.

Some pre-aligned kinematic modules have been devised specifically for processing lasers. In U.S. Pat. No. 5,748,827, Holl & Sabeti use a two-stage mount including a "macrostage" for coarse alignment, a "microstage" for fine alignment, and a compliant layer between the two stages. However, while their beam-positioning tolerance of ±10 µm is acceptable for their application of photocytometry and for some processing applications such as annealing, it is too loose for other applications such as holography and high-precision laser ablation.

In Published U.S. Pat. App. No. 2006/0249488, Jurgensen pre-aligns diode pump laser assemblies for fiber lasers that engrave ink-holding cavities on a metal printing drum. The working-spot size of 100 µm is too large for some ablation, micro-marking, and micro-bonding applications. Furthermore, while the '488 application's storage of spare lasers in place on the working laser support platform does reduce down-time, many factory environments, such as clean rooms where each cubic foot adds significant expense, cannot cost-effectively spare that much extra space on or around the tool for equipment that is not operating. Even where the space is available, ambient vibration, local shocks, or thermal cycling could gradually cause the pre-alignment to drift out of tolerance while the replacement lasers are stored on the platform.

In U.S. Pat. No. 6,424,670, Sukhman et al. pre-align laser modules and optics modules to be automatically interfaceable with each other when they are mounted on a common laser support platform. While '670 has an advantage of being able to replace either a laser module or an optics module, depending on where the failure occurs, it does not address thermal concerns—possibly because the '670 lasers seem to operate in enclosed cabinets whose temperature may be regulated—or situations where some separate element of a closed-loop control system needs to be calibrated to the individual replacement laser.

From the above discussion, none of the prior-art replaceable modules fully address the needs of high-power working lasers with separate control beams. Therefore, an unaddressed need exists for such a system.

When multiple working lasers operate together on a single tool, sometimes they all must be replaced at once. Sometimes two or more reach the end of their useful life at the same time. Also, in some settings such as job-shops where space is limited, budgets for expensive platforms and workpiece stages are tight, and processing needs change constantly, the ability to quickly exchange a group of processing lasers for a group with a different power, wavelength, or optical configuration type would be a significant economic advantage. Therefore, a largely unaddressed need exists for quickly replaceable groups of processing-laser modules that include aligned optics and calibrated control sources for each working laser in the group.

BRIEF SUMMARY OF THE INVENTION

An object of this invention is rapid replacement of processing lasers that use individually calibrated control beams with no need for substantial in situ alignment or recalibration, to reduce down-time resulting from a component failure. Accordingly, the invention includes a lightweight pre-aligned modular assembly that combines a working laser, a control light source, and the beam trains for both light sources on a baseplate with kinematic features that enable the module to be mounted in a self-aligned position on a mating subassembly baseplate.

Another object of this invention is rapid replacement of groups of processing lasers to reduce down-time, either in the event of performance degradation or to change the process performed by a laser processing tool. Accordingly, the invention includes a kinematically-mounted subassembly of multiple pre-aligned laser modules that can be replaced as a single piece without substantial in situ alignment.

Another object of this invention is to provide replaceable laser modules and subassemblies with sufficiently high spot-position accuracy for high-precision processes such as laser ablation. Accordingly, this invention includes pre-aligned modules with a pre-calibrated control beam and associated active mechanism.

Another object of this invention is to provide replaceable laser modules and subassemblies with small working-spot size. Accordingly, this invention includes a group of individual, relatively low-power lasers with relatively high beam quality, each generating its own small working spot, rather than splitting the output of a relatively higher-power laser into multiple working spots with relatively low beam quality.

Another object of this invention is temperature insensitivity of the alignment of each working beam. Accordingly, this invention includes kinematic bases that register at their physical, thermal, or optical midpoints and matching of coefficients of thermal expansion (CTE) between mating parts.

Another object of this invention is to detect problems with replacement modules before they adversely affect a workpiece. Accordingly, this invention includes a "spot-check" tool for verifying that a replacement module delivers its beams to the intended process target position.

Other objects of this invention are small physical footprint and high process speed. Accordingly, this invention could include a staggered module-mounting arrangement within a multi-module subassembly so that the working spots can be spaced closer together than the module diameter. This allows simultaneous processing of closely-spaced process targets during a single pass.

Other objects of this invention are low cost and simplicity. Accordingly, this invention includes a mechanism by which multiple processes can be performed either simultaneously on the same tool, or in series on the same tool with minimal down-time associated with changing lasers.

BRIEF DESCRIPTION OF THE DRAWINGS

FIG. 1 shows two shaded perspective views of an exemplary module mounting base and mating base according to this invention.

FIGS. 2a-2d show successive stages of a pre-aligned laser module according to this invention being assembled and pre-aligned on an offline alignment fixture.

FIG. 3 shows a pre-aligned laser module according to this invention being installed on a subassembly base, with other laser modules shown in operation.

FIG. 4 shows a subassembly base according to a preferred embodiment of this invention with pre-aligned laser modules attached, and a platform base to which it kinematically mates and reversibly locks.

FIG. 5 is a top view, with perspective, of an exemplary pair of laser modules designed for staggered arrangement on the subassembly base to allow a spacing between working beams that is narrower than the widest component mounted to either of the module bases.

DETAILED DESCRIPTION OF THE INVENTION

Aspects of this invention improve the cost-effectiveness of replacing processing lasers and optics at three levels: (1) the individual laser-module level, (2) the subassembly level, and (3) the laser platform assembly level.

FIG. 1 shows the basic building block of this invention, a module mounting base (MMB) 100 designed to kinematically mate to a locating surface 150. MMB 100 includes assorted features 111 for attaching the working laser, the control light source, and the mounted optics, mechanics and detectors on the surface shown here as the top. MMB 100 also includes locating features 101, 102a, and 102b on the surface shown here as the bottom. These locating features mate with receiving features 151, 152a, and 152b on locating surface 150. When mated and locked in place by temporary locks (not shown; can be clamps, magnets, bolts, springs, etc.), the locating features and receiving features constrain all the degrees of freedom of motion of MMB 100 with respect to locating surface 150. The most constrained point is the registration point where locating feature 101 mates with receiving feature 151.

In the preferred embodiment, the registration point is at the thermal midpoint of MMB 100, so that thermal expansion and contraction take place around a point that makes alignment insensitive to temperature. For instance, in many systems the condenser assembly that forms the working spot has the tightest alignment tolerances. Positioning the registration point under it, so that it stays stationary when the temperature changes, can make the alignment less temperature-sensitive in some cases. The figure shows the registration point at the physical midpoint for simplicity. However, the thermal midpoint may be removed from the physical midpoint because the main heat source, the working laser, is usually at one end of the module rather than in the center. Both thermal and optical modeling contribute to locating the best registration point for a given system. In addition, the tolerant direction of non-registration receiving features (here, shown for example as slots 152a and 152b, though any suitable pairing of kinematic locating and receiving features can be used) should preferably be arranged to minimize bending stress on MMB 100 in case of thermal expansion.

Initially, each module is built on an alignment fixture base located off the laser-processing line, preferably well before it is needed on the manufacturing line. FIGS. 2a-2d show an example of a module according to one embodiment of this invention being aligned in several stages. In FIG. 2a, MMB 200 is initially positioned by mating locating features 201, 202a and 202b (with only 202b visible in this view) to receiving features 251, 252a, and 252b (with only 252b visible in this view) on alignment base 250, and fixed in position by temporary locks, shown here as clamps 220 that may be fastened to clamp receivers 253 in alignment base 250. (Locks 220 will eventually be used to attach the finished module to the laser processing tool. For very alignment-sensitive optical trains—for instance, those that create a particular interference pattern—having locks 220 engaged during alignment phase can be critical to ensuring correct alignment during operation, because even the small difference in stress on MMB 200 caused by engaging locks 220 can throw an acceptable alignment out of tolerance. However, if the optical train is not that alignment-sensitive, locks 220 may not need to be engaged during alignment). Alignment base 250 has additional receiving features 254 for the various alignment tools that can be used to align components of the module.

If alignment tolerances are very tight (microns or less, as is typical of ablation and some other processes), careful attention must be given to ensuring that locks 220 exert the same forces on MMB 200 in the alignment fixture that they eventually will when the finished module is locked to a subassembly base on the manufacturing line. Two recommendations applicable to bolted clamps are (1) keep the clamps used for alignment with the module and use them again for installation, and (2) use a fixed torque setting when tightening the bolts, both for alignment and for installation.

In FIG. 2b, working laser 230 is mounted on MMB 200, and the position and angle of working beam 231 is aligned to a pair of alignment tools 261 and 262, which can comprise visual or electronic means of detecting beam position and angle (or beam position at two points, from which angle can be calculated). Depending on the types of alignment required, the configuration of the lasers and optics on the module, the size of the alignment tools, and the space available, the alignment tools can be either permanently or removably-and-replaceably mounted to alignment base 250. The position and angle of the laser beam can be aligned by moving the laser body, by adding and adjusting beam-steering optics such as flat mirrors, windows, and prisms, or by designing MMB 200 such that the mounting features can be translated or tilted relative to the locating features. Once the beam alignment is satisfactory, working laser 230 is locked in position. In FIG. 2c, control light source 240 and beam combiner 242 have been added and aligned so that control beam 241 has the desired spacing and relative angle with respect to the working beam (here shown as collinear and coaxial). Once alignment tools 261 and 262 show satisfactory alignment of control beam 241, control light source 240 and beam combiner 242 are locked in place. FIG. 2d shows the addition of beam-forming optics (here shown as beam expander 243 and condenser 244, but those skilled in the art will recognize that this invention will work with any suitable beam-forming optics), which have been aligned with the help of other alignment tools, for example beam profiler 263. After all the components are aligned and locked in place, and any necessary calibration of working beam 231 to control beam 241 and its control electronics (not shown) has been performed, housings or covers (if any) are added, locks 220 are unlocked (in preferred designs, the locks are designed to be engaged and disengaged without disturbing a module's components, housings, or covers), and the finished pre-aligned module is removed from the alignment fixture and stored in a safe place offline.

FIG. 3 shows a multi-module subassembly on a manufacturing line. Here, finished laser modules 345.1 and 345.2 are already installed and locked on subassembly base 350, and finished laser module 345.3 is in the process of being installed. Installed modules 345.1 and 345.2 are shown emitting working beams 331.1 and 331.2 and control beams 341.1 and 341.2, which focus on vertical workplane 370 (this aspect of the drawing is to show operating conditions; the installed modules would not necessarily be turned on while a new module was being added). Modules with folding optics for processing a horizontal workplane may be just as easily designed. Like the alignment base in FIG. 2, subassembly base 350 has receiving features 351, 352a, and 352b for mating to locating features 301 (not visible in this view), 302a, and 302b on module 345.3. The process of replacing a laser module on subassembly base 350 can thus be reduced to placing module 345.3 with its locating fixtures matched to the appropriate receiving fixtures and engaging locks 320 with lock receivers 353. A spot-check with a fixture or sample may be desirable, but no further alignment is generally necessary. Down-time associated with replacing a failed laser is thus reduced from hours to minutes and substantial production cost is saved.

FIG. 4 shows a preferred embodiment of a subassembly base 450 that allows quick, easy replacement of an entire subassembly of laser modules. This capability is useful if several lasers, installed together, are nearing the end of their useful life, or when it is economically advantageous to use the same tooling platform for different kinds of laser processing at different times. Here, subassembly baseplate has pre-aligned laser modules 445.1, 445.2, and 445.3 installed and locked to its top surface. On its bottom surface, it has locating features 454, 455a, and 455b, of a suitable scale and precision for positioning an entire subassembly with the desired accuracy. These locating features mate to receiving features 481, 482a, and 482b in platform base 480. Then subassembly plate 450 is locked to platform base 480 using scaled-up reversible locks 421 that engage to lock receivers 483. (In the embodiment shown in the drawing, all features 481-483 go all the way through to the top of platform base 480 and are available on that surface). Just as with the module bases, the registration point (where locating feature 454 meets receiving feature 481) is at the thermal-expansion center of the subassembly.

FIG. 5 is a top view, with perspective, of two modules 545 and 546 attached to a subassembly baseplate 550 in an embodiment designed for applications where the working beams must be spaced closer together than straightforward side-by-side module mounting would allow—that is, with a spacing narrower than the widest component mounted on the MMB. Although the drawing shows only two lasers, this staggered pattern or mirror-images of this staggered pattern could be repeated with more lasers, and other staggered arrangements could be devised for differently-arranged beam trains. This requirement sometimes arises in, for instance, scribing of parallel lines in large photovoltaic panels, vehicle or architectural "smart glass," or display screens. In this alternate embodiment, there are two or more module types that stagger the position of the bulkier components, so that less clearance is needed between the beams. If the locating features need to be in different places on the different module types for mechanical or thermal stability, both the subassembly baseplate and the corresponding alignment baseplate need to have receiving features for both module types. The economic advantage of quick and easy replacement of lasers on the line will often justify this extra layer of complexity, if the process requires it.

Several other mechanical and thermal considerations apply to the overall design of various embodiments of this invention. The optical mounts, module base, alignment base, subassembly base, platform base, and whatever supports the platform base should preferably have very similar coefficients of thermal expansion. Light weight is also desirable to prevent overburdening of the platform and its support structure, which over long-term use might change its shape or weaken any stressed joints, and to make switching modules and subassemblies easier and safer. Channeled or honeycombed bases can sometimes reduce the weight of modules and subassemblies while still providing enough stiffness to maintain optical alignment.

A system of replaceable subassemblies of multiple pre-aligned modules according to this invention has been shown to can maintain micron tolerances of working-spot size and position over ambient temperature variations of ±10° C. This performance is adequate for ablation processes on large-area substrates in open factory environments, which were previously very difficult and involved significant down-time for alignment maintenance.

Some processes may involve modules that produce different types of working beams mounted together on the same subassembly. Particularly if the different modules look similar from the outside, using different kinematic feature geometries for the different modules, making it impossible to mount the wrong module in the wrong position on the subassembly may be helpful.

In summary, this invention reduces downtime on a laser processing line by providing quickly replaceable pre-aligned modules and quickly swappable multi-module subassemblies. The modules include aligned optics and, where needed, calibrated control light sources as well as the working laser. Those skilled in the art will recognize that neither this description nor the accompanying drawings, but only the claims, limit this invention's scope.

The inventor claims:

1. A system for providing quick replacement of pre-aligned processing-laser modules, comprising:
   a module mounting base having
      a locating feature, and
      mounting features for mounting a working laser and its optical train, and a reversible lock;
   an alignment fixture base having
      a receiving feature designed to kinematically mate to the locating feature on the module mounting base,
      alignment features designed to position alignment tools and align the working laser and its optical train, and
      a lock receiver designed to engage the reversible lock; and
   a subassembly base having
      a receiving feature designed to kinematically mate to the locating feature on the module mounting base, and
      a lock receiver designed to engage the reversible lock; where
   a laser module assembled and pre-aligned with its module mounting base kinematically mated and locked to the alignment fixture base is unlocked, removed from the alignment fixture base, and kinematically mated and locked to a subassembly base in a condition substantially ready for operation; and
   the locating feature has a registration point positioned at a center of thermal expansion of the module mounting base when the mounted laser and its optical train are operating.

2. The system of claim 1, where the locating feature further has a registration point positioned under the most alignment-sensitive element of the module.

3. The system of claim 1, where the reversible locks are engaged by applying a controlled torque.

4. The system of claim 1, where the module base is made of a lightweight, stiff channeled or honeycombed material.

5. The system of claim 1, where the module base and the subassembly base are made of materials with substantially similar coefficients of thermal expansion.

6. The system of claim 1, further comprising a control light source and its control optical train, mounted and aligned to the module mounting base on the alignment fixture base along with the working laser and its optical train.

7. The system of claim 6, where the control beam and its control electronics are calibrated to the working laser on the alignment fixture base.

8. A system for providing quick replacement of pre-aligned processing-laser modules, comprising
   a module mounting base having a locating feature, and mounting features for mounting a working laser and its optical train, and a reversible lock;
   an alignment fixture base having a receiving feature designed to kinematically mate to the locating feature on the module mounting base, alignment features designed to position alignment tools and align the working laser and its optical train and a lock receiver designed to engage the reversible lock; and
   a subassembly base having a receiving feature designed to kinematically mate to the locating feature on the module mounting base, and a lock receiver designed to engage the reversible lock;
   where a laser module assembled and re-aligned with its module mounting base kinematically mated and locked to the alignment fixture base is unlocked, removed from the alignment fixture base, and kinematically mated and locked to a subassembly base in a condition substantially ready for operation;

the system further comprising:

a subassembly-locating feature on the subassembly base;

a reversible subassembly-lock; and a platform base attached to a laser processing tool and having a subassembly-receiving feature designed to kinematically mate to the subassembly-locating feature, and a subassembly-lock receiver designed to engage the reversible subassembly-lock;

where a subassembly having a plurality of laser modules pre-aligned and locked to a subassembly plate can be placed on the platform base with the subassembly-locating features mated to the subassembly-receiving features, locked in place by engaging the reversible subassembly-lock with the subassembly-lock receiver, with the plurality of laser modules in a substantially operation-ready alignment condition; and where the subassembly-locating feature has a registration point positioned at the center of thermal expansion of the subassembly base when the laser modules attached to the subassembly base are operating.

9. The system of claim 8, where the subassembly base and the platform base are made of materials with substantially similar coefficients of thermal expansion.

10. The system of claim 8, where the subassembly base is made of a lightweight, stiff channeled or honeycombed material.

11. The system of claim 8, where the reversible lock and the reversible subassembly-lock are designed to engage and disengage with the lock-receiver and the subassembly-lock receiver, respectively, without mechanically disturbing any component, housing, or cover mounted on a module mounting base, an alignment-fixture base, a subassembly base, or a platform base.

\* \* \* \* \*